INVENTOR.
ARTHUR J. PEARSON
BY
*Staehin ◦ Overman*
ATTORNEYS

United States Patent Office 3,513,065
Patented May 19, 1970

3,513,065
FILM FACED FIBROUS BODY
Arthur J. Pearson, Granville, Ohio, assignor to Owens-Corning Fiberglas Corporation, a corporation of Delaware
Continuation of application Ser. No. 292,350, July 2, 1963. This application Apr. 19, 1967, Ser. No. 632,110
Int. Cl. B32b
U.S. Cl. 161—93                     2 Claims

ABSTRACT OF THE DISCLOSURE

The disclosure embraces a substantially rigid laminated panel comprising a body of interbonded compressed glass fibers with a layer of scrim textile of glass fibers on a major surface of the fibrous body, a preformed resinous film on the layer of scrim textile and adhesive securing the film to the scrim textile and the textile to the fibrous body. The panel may include a layer of foil between the resinous film and the scrim textile and adhesively secured to the resinous film and the scrim textile.

---

Figure 1:
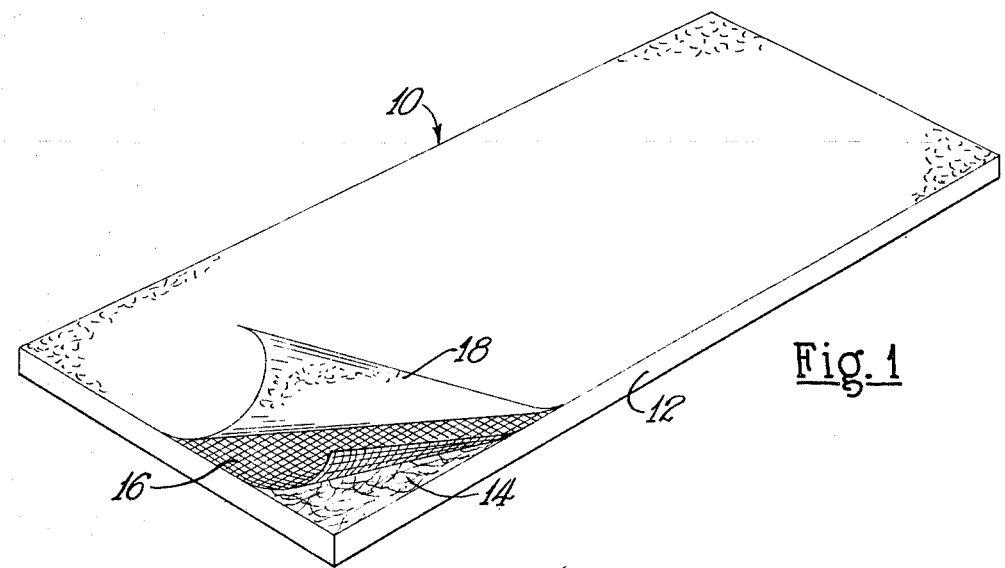

This application is a continuation of application Ser. No. 292,350 filed July 2, 1963, now abandoned.

This invention relates to film faced fibrous bodies and more especially to bodies fashioned of mineral fibers having a major surface faced with a resinous film with a scrim reinforcement between the fibrous body and the film.

The invention more particularly pertains to fibrous mats, boards or tiles formed of mineral fibers, such as fibers of glass, slag, or other mineral material, wherein the mats, boards or tiles may be of various densities for different uses as for thermal insulation, acoustic tiles for walls or ceilings or the film faced bodies may be employed in fabricating duct systems for the transmission or conveyance of warm or cold air.

Fibrous mats have been fashioned of glass fibers in which a major surface is coated with a resinous film but products of this character have lacked adequate strength characteristics for many uses and an unreinforced film facing has poor resistance to impact and lacks abuse resistant characteristics.

An object of the present invention is the provision of a fibrous product comprising a body formed of mineral fibers having a surface or area faced with a resinous film and a scrim-type reinforcement disposed between the film and the body surface, the components being adhesively joined or bonded to provide a product having high strength characteristics and effective acoustical and thermal insulating properties rendering the product suitable for many and various uses.

Another object of the invention is the provision of a product comprising a porous body of mineral fibers reinforced by a layer of scrim fabric adhered to a major face or surface of the product and a resin film superposed on the scrim fabric and adhered thereto, the film facing providing an attractive appearance enhancing the use of the product as a surfacing material where comparatively lightweight and substantial strength characteristics are desired.

Another object of the invention resides in the provision of a comparatively dense body of mineral fibers, such as glass fibers, laminated with successive layers of scrim fabric or textile, a metallic foil providing an effective moisture barrier and a finishing layer of resin film, the components being bonded or adhered together into an integral body particularly usable in the fabrication of ducts for the transmission of warm or cold air having high puncture resistance, high tear strength and structural strength characteristics providing for greater spanability without appreciable sagging.

Another object of the invention resides in the provision of a wall surfacing unit comprising a fibrous body of mineral fibers of comparatively low density faced with a resinous film and a textile scrim material adhesively joined to the fibrous body and the resinous film wherein the film may be fashioned with an embossed pattern presenting an attractive appearance as a wall surfacing medium, the embossing in the resin film providing an effective mask for obscuring the pattern of the scrim reinforcement.

Figure 2:
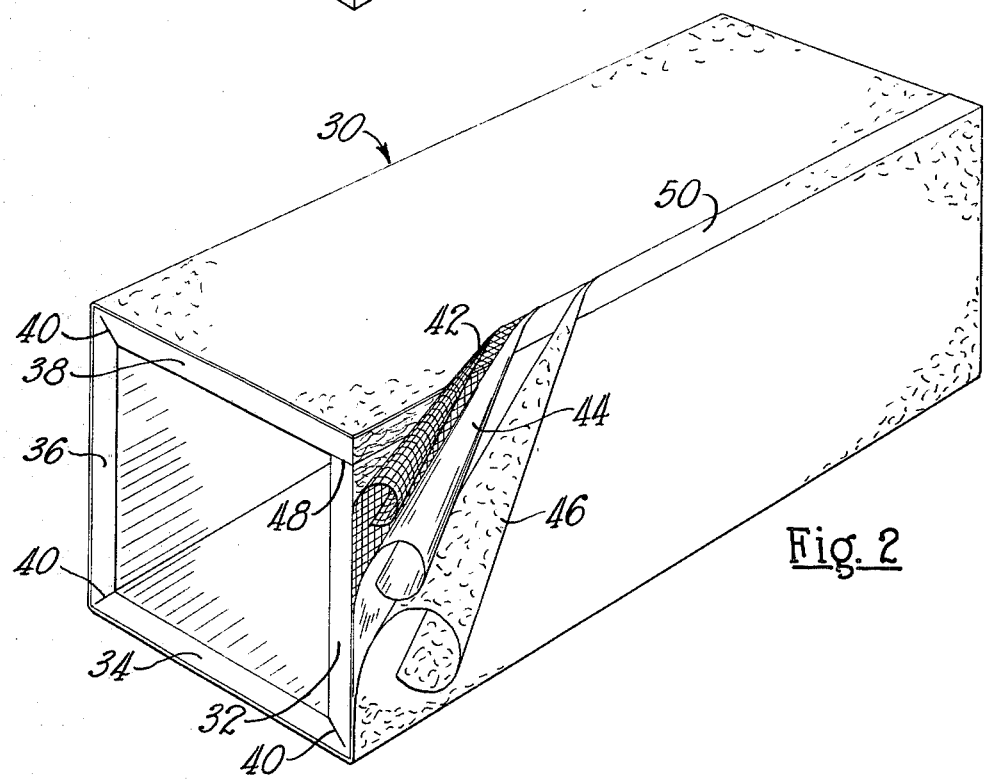

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is an isometric view of a reinforced film faced fibrous body, of the invention, and FIG. 2 is an isometric view of a reinforced film faced fibrous duct construction of the invention.

The product or composite article of the invention comprises a fibrous base or body formed of mineral fibers, such as glass fibers, reinforced by a suitable means and faced with a resin film usable as a surfacing material, acoustic tile, for air duct fabrication or wherever lightweight, high strength material is desirable.

Referring to the drawings, FIG. 1 illustrates one form of product 10 of the invention reinforced to provide high strength characteristics of a character usable for thermal insulation, or as a surfacing material or acoustic tile having particular application for ceilings or walls wherein the film facing enhances the decor or visual appearance of the product without appreciably affecting its sound attenuating properties.

As illustrated in FIG. 1, the base or body 12 is fashioned of mineral fibers, such as glass fibers, in mat formation and the fibers compressed to a desired density depending upon the end use for the product. Where substantial rigidity is not required, the body 12 may be of a density of about three pounds per cubic foot or less. Where substantial rigidity is desired, the fibers of the board or body 12 may be compressed to a density greater than three pounds per cubic foot.

The body or mat 12 may be of a thickness of from ⅜ of an inch up to 2 inches or more depending upon the end use for the product and is prefabricated by conventional methods. For example, attenuated glass fibers, bearing a suitable binder or adhesive such as phenolformaldehyde, are collected in a mass, the mass compressed to the desired thickness and density, and the mat in compressed condition conveyed through a heated environment or oven to set or cure the binder or adhesive to provide mass integrity in the mat.

A feature of the invention involves the provision of a scrim reinforcement for the fibrous body 12 and a film facing on the product. As shown in FIG. 1, there is disposed contiguously with a major face 14 of the body 12, a reinforcing layer of scrim material or textile 16 which is adhesively joined to the face 14 of the body 12. Superposed on the scrim reinforcement 16 is a resinous film 18 which is adhesively bonded or joined with the reinforcement 16 providing a laminated, scrim reinforced film faced fibrous product.

The scrim component 16 is preferably formed of strands or yarns of glass filaments or fibers fabricated as an open mesh textile wherein the strands or yarns are woven or unwoven in formation of the scrim component.

The facing film 18 is in the form of a prefabricated, self-supporting film, such as a vinyl film preferably fashioned with embossing to present an attractive appearance by masking the mesh pattern of the scrim material.

The scrim reinforcement 16 is adhesively joined to a major surface or area of the fibrous body 12 and the facing film 18 adhesively joined to the scrim material 16 by a suitable adhesive of a character to provide a permanent bond holding the components in assembled relation. The adhesive preferably includes a solvent type synthetic rubber bases such as a neoprene rubber containing other constituents or fillers functioning as flame retarders providing low flame propagation characteristics.

The fibrous body 12, the scrim reinforcement 16 and the film facing 18 are processed by the use of conventional laminating methods whereby the adhesive securely adheres or joins the scrim to the fibrous body 12 and the film 18 to the scrim reinforcement. The laminated product is conveyed through a heated oven in which air is circulated for setting the adhesive and accelerating evaporation of the solvent. Other types of suitable adhesive may be used, if desired.

The end product illustrated in FIG. 1 may be used as thermal insulation, acoustic tile or as a surfacing board for walls and ceilings. The product provides effective sound attenuation and the sound attenuating properties may be enhanced by pinhole perforations in the facing film 18. It is to be understood that while vinyl film, being a copolymer of vinyl chloride and vinyl acetate, provides a satisfactory film facing for the product, other resin films may be utilized for the purpose.

FIG. 2 illustrates a tubular duct embodying the invention, the duct being particularly adaptable for conveying warm or cold air in heating or air conditioning systems. The duct 30 comprises four panel sections 32, 34, 36 and 38 which form the upper, lower, and side walls of the duct 30. The fibrous mat components of these walls are fashioned of binder-bearing mineral fibers, such as glass fibers, and are formed by a conventional method of accumulating glass fibers upon a conveyor, compressing the fibers to a mat of desired density and thickness and curing the binder in the mat to form a substantially rigid panel construction.

The density of the panel sections is comparatively high in order to attain substantial rigidity suitable for forming the duct. The thickness of the panel sections may be from ¾ to 2 inches or more. The fibrous panel sections may be prefabricated as a single mat or panel of a widths equal to the combined width of the four wall sections and the mat processed with three grooves suitably chamfered to enable the folding of the single mat section into the rectangular shape, shown in FIG. 2, the chamfered grooves forming the corner regions 40 in the end product.

The mat of panel sections is laminated with a scrim reinforcement material or open mesh textile 42, a metallic foil layer 44 providing a moisture barrier, and a finish layer 46 of resin film, such as vinyl film. In fabricating the duct or product 30, shown in FIG. 2, where the wall panel sections 32, 34, 36 and 38 are fashioned as a single mat grooved to provide the corner junctions, the sections are in a flat or uniplanar condition during the laminating operations. An adhesive is appled to the ungrooved major face of the mat and a layer of the scrim reinforcing material 42 applied to the ungrooved surface.

The layer of metallic foil 44 is then superposed upon the layer of scrim fabric 42. As the scrim material or fabric is of open mesh character, the adhesive in the interstices of the scrim material is ordinarily sufficent to adhere the metal foil 44 to the scrim material as well as adhering the scrim material to the mat.

However, in some instances, it may be desirable to apply additional adhesive onto the scrim material before the foil layer is applied. Adhesive is then applied to the outer surface of the metallic foil 44 or to a surface of the resin film 46 and the film superposed on the layer of foil 44 forming a laminated product in planar configuration.

Heat and pressure are then applied to the laminated assembly to set or cure the adhesive. The planar assembly of mat laminated with the scrim reinforcement, the metal foil 44 and the resin film 46, is then folded at the regions of the grooves into the rectangular configuration shown in FIG. 2. The lapping or abutting outer edges of the assemblage, being the adjacent edges of the panel sections 32 and 38, are joined together at the region 48 by a suitable adhesive applied to the abutting regions of the panel sections.

The regions of the scrim reinforcement, the metal foil and the resin film are folded over the overlap at the juncture of the edges of panel sections 32 and 38 in the manner indicated at 50 and suitable adhesive or cementitous material applied to join these overlapping portions together and the scrim reinforcement 42 to the edge region of the panel 48 to complete the assembly and form a sealed joint. If desired, a separate sealing strip may be used to join the sections at the overlapping region 48.

The product may be fashioned by employing four individual panel sections of fibrous mat disposed in a single plane in side-by-side relation to facilitate laminating the scrim fabric, metallic foil and resin film with the sections. Where the panel sections are individual the edges of each section forming the junctures or corners 40 are suitably chamfered so that when the laminated assembly is folded into rectangular shape, the chamfered edges meet at the juncture lines indicated at 40. The laminated assembly, in flat or uniplanar condition, is placed in a heated oven in which air is circulated to accelerate setting of the adhesive.

A scrim reinforcement of glass fibers or filaments having approximately ten threads or yarns per inch has been found to provide an effective reinforcement for the product, but it is to be understood that a finer or coarser mesh scrim may be employed if desired.

The duct construction, embodying the scrim reinforcement with the foil layer provides high puncture and impact resistance and is endowed with high strength characteristics to resist sagging and providing for greater spanability between supports in a duct system. The duct of the invention is fire resistant and has excellent thermal insulation characteristics and acoustic properties.

It is apparent that, within the scope of the invention, modifications and different arrangements may be made other than as herein disclosed, and the present disclosure is illustrative merely, the invention comprehending all variations thereof.

I claim:

1. A rigid laminated panel comprising a flat body of interbonded compressed glass fibers of a thickness in a range of from three-eighths of an inch to two inches and of a density not less than three pounds per cubic foot, a layer of scrim textile of glass fibers disposed on and engaging a major surface of the flat fibrous body, a preformed film of flexible facing material contiguous to and co-extensive with the layer of scrim textile, and an adhesive securing the layer of scrim textile to the flat body and to the film of facing material, the other major surface of the flat body having spaced parallel grooves extending partially through the body, said grooves providing weakened regions whereby sections of the panel defined by the grooves may be bent to angular positions one with respect to another.

2. A rigid laminated panel comprising a flat body of interbonded compressed glass fibers of a thickness in a range of from three-eighths of an inch to two inches and of a desity not less than three pounds per cubic foot, a layer of scrim textile of glass fibers disposed on and engaging a major surface of the fibrous body, a layer of metal foil engaging and in contiguous relation with the layer of scrim textile, a preformed film of resinous material engaging and in contiguous relation with the metallic foil, an adhesive bonding the layer of scrim textile to the fibrous body and to the metallic foil, and an adhesive bonding the film of resinous material to the metallic foil, the other major surface of the fibrous body having a plurality of spaced parallel grooves providing bending regions for shaping the sections of the panel defined by the grooves into a tubular duct.

References Cited

UNITED STATES PATENTS

| | | | |
|---|---|---|---|
| 3,276,928 | 10/1966 | Pearson et al. | 156—62.4 |
| 3,092,203 | 6/1963 | Slayter et al. | 181—33 |
| 3,081,705 | 3/1963 | Warnken. | |
| 3,052,019 | 9/1962 | Strasser. | |
| 2,804,416 | 8/1957 | Phillipsen | 161—160 X |
| 2,561,891 | 7/1951 | Tucker | 161—89 X |
| 1,875,735 | 9/1932 | Jackson | 161—89 X |

ROBERT E. BURNETT, Primary Examiner

R. L. MAY, Assistant Examiner

U.S. Cl. X.R.

138—141, 143; 161—121, 151